United States Patent

[11] 3,572,746

[72] Inventor James P. Mueller
East Peoria, Ill.
[21] Appl. No. 731,433
[22] Filed May 23, 1968
[45] Patented Mar. 30, 1971
[73] Assignee Caterpillar Tractor Co.
Peoria, Ill.

[54] VEHICLE STABILIZER
10 Claims, 5 Drawing Figs.
[52] U.S. Cl. .................................................. 280/112, 280/6
[51] Int. Cl. .................................................. B60g 21/00
[50] Field of Search .................................................. 280/124 (F), 6, 6.1, 112.1

[56] References Cited
UNITED STATES PATENTS
2,993,706  7/1961  Kilgore .................. 280/124F
3,143,361  8/1964  Herbenar ............... 280/124F Primary Examiner—Philip Goodman
Attorney—Fryer, Tjensvold, Feix, Philips & Lempio ABSTRACT: A stabilizing means for controlling the attitude of a vehicle having an oscillatable rear axle in which hydraulic jacks are mounted so as to operate between the vehicle body or frame and the oscillatable axle; the jacks are actuated in accordance with the fluid pressure received from a servovalve mounted on the axle.

INVENTOR
JAMES P. MUELLER

INVENTOR
JAMES P. MUELLER

VEHICLE STABILIZER

In many vehicles, oscillation of one or more axles with respect to the machine frame is deemed necessary to provide operator comfort. The oscillation also produces better roadability characteristics for the machine and reduces frame stresses due to twisting when traversing uneven surfaces. However, in such a machine side loads are sometimes experienced which can cause tipping of the machine. Such side loads can be experienced, for example, when the machine is being loaded from the side or during side hill operation thereof. The prevention of such tipping can be obtained through the use of a more rigid base and the machine attitude can be controlled, to compensate for side pull or side hill operation of the machine, by a stabilizing means. In other words, if, during a side hill pull or side hill operation, a side load were applied on the downhill side of the machine, the machine would tend to tip in that direction. A stabilizing means would prevent this by the progressive stiffening of the stabilizing jacks between the vehicle frame and the axle on the downhill side of the vehicle.

It is therefor an object of this invention to provide a suspension system which will permit rear axle oscillation, but will have a variable stiffness depending upon the magnitude of a tipping load.

It is also an object of the invention to provide a suspension system which allows one or more axles of a vehicle to oscillate, thereby absorbing shock from uneven terrain, while providing a stiffer suspension when side loads are applied to the machine.

It is a further object of this invention to provide a stabilizing means, mounted on a vehicle, which is actuated by the forces acting upon the vehicle frame.

It is also an object of this invention to provide such a stabilizing means which may be utilized at the will of the vehicle operator.

Further and more specific objects and advantages of the invention will become apparent to those skilled in the art upon perusal of the following specification wherein embodiments of the invention are described by reference to the accompanying drawings.

Figure 1:
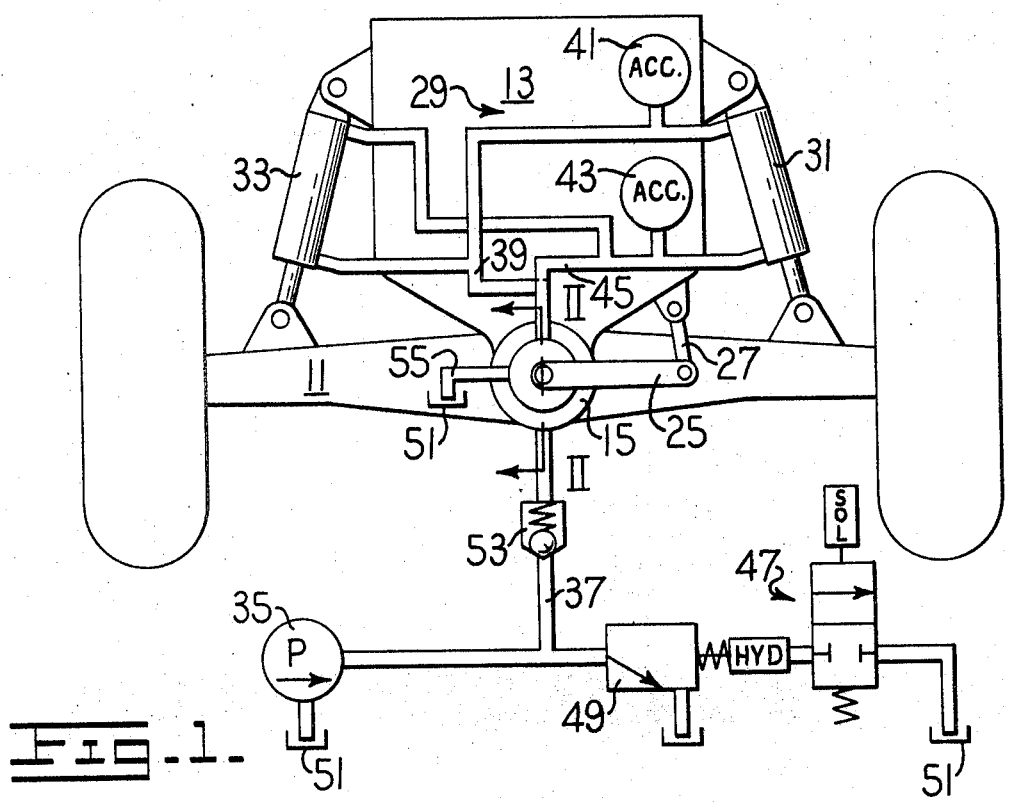
FIG. 1 is a schematic illustration of the preferred embodiment of the invention, showing the means utilized for stabilizing the vehicle, from an end view.

Referring now to the drawings in greater detail:

There is shown in FIG. 1 an axle assembly 11 pivotally connected to a machine frame 13. A rotary servovalve 15 is mounted coincidentally with the longitudinal centerline of the pivot connection so that the housing of the servovalve will move with axle 11. The sleeve 17 of the servovalve is connected to the trunnion 19 of the axle 11 by means such as pin 21. The valve spool 23 is connected to an arm 25 which, in turn, is connected to the machine frame 13 by a link 27. Thus, any relative movement between the axle and the machine frame will activate the rotary servovalve.

If the work being performed by the machine creates forces which tend to tilt frame 13 in a clockwise direction, as shown by arrow 29, the action causes a jack 31 to retract and a jack 33 to extend. The rotation also causes the link 27 and arm 25 to move downwardly so that the servovalve is actuated. Actuation of valve 15 causes fluid from a pump 35 to be transferred through a line 37 into the valve. Fluid leaving the valve is then transferred through a line 39 to the head end of jack 31 and the rod end of jack 33. This causes the frame 13 to rotate in the counterclockwise direction until the servovalve 15 is closed so that axle 11 and frame 13 are returned to the position shown in FIG. 1.

Should one of the wheels pass over an obstruction, the jack on that side of the vehicle would be retracted and the jack on the opposite side would be extended, causing valve 15 to be opened. However, the action would be so fast that very little hydraulic fluid, if any, would be admitted to the circuit through the valve. Since the oil being expelled from the head end of the retracting jack and the rod end of the extending jack must be absorbed somewhere in the system without over pressurization accumulators 41 and 43 have been provided within lines 39 and 45 respectively for this purpose. When the wheel has passed the obstruction, the accumulators then return the fluid to the stabilizing system.

A solenoid operated valve 47 may be included in the stabilizing circuit and controlled by a switch (not shown) on the operator's console. When he desires, the operator may cut the stabilizing means out altogether by venting a release valve 49 through the valve 47. This vents the hydraulic fluid pumped through pump 35 to the sump 51 at relatively no load so that pressurized fluid is not available to the stabilized circuit.

A check valve 53 prevents shock load to the pump and traps any pressure surges in the accumulators during operation of the stabilizing means. When the operator actuates solenoid valve 47, valve 53 keeps the stabilizing system from becoming immediately inactive. Several oscillations of the axle, however, will cause the accumulators and jacks to be vented through the servovalve 15 and line 55 to sump 51 so that eventually the system will become inoperative.

Figure 4:
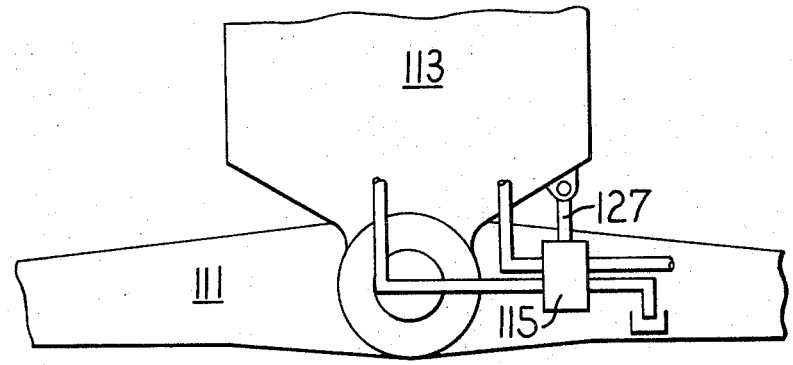
FIG. 4 shows, in a view similar to FIG. 1, an alternate embodiment for the means of actuating the vehicle stabilizer.
Figure 2:
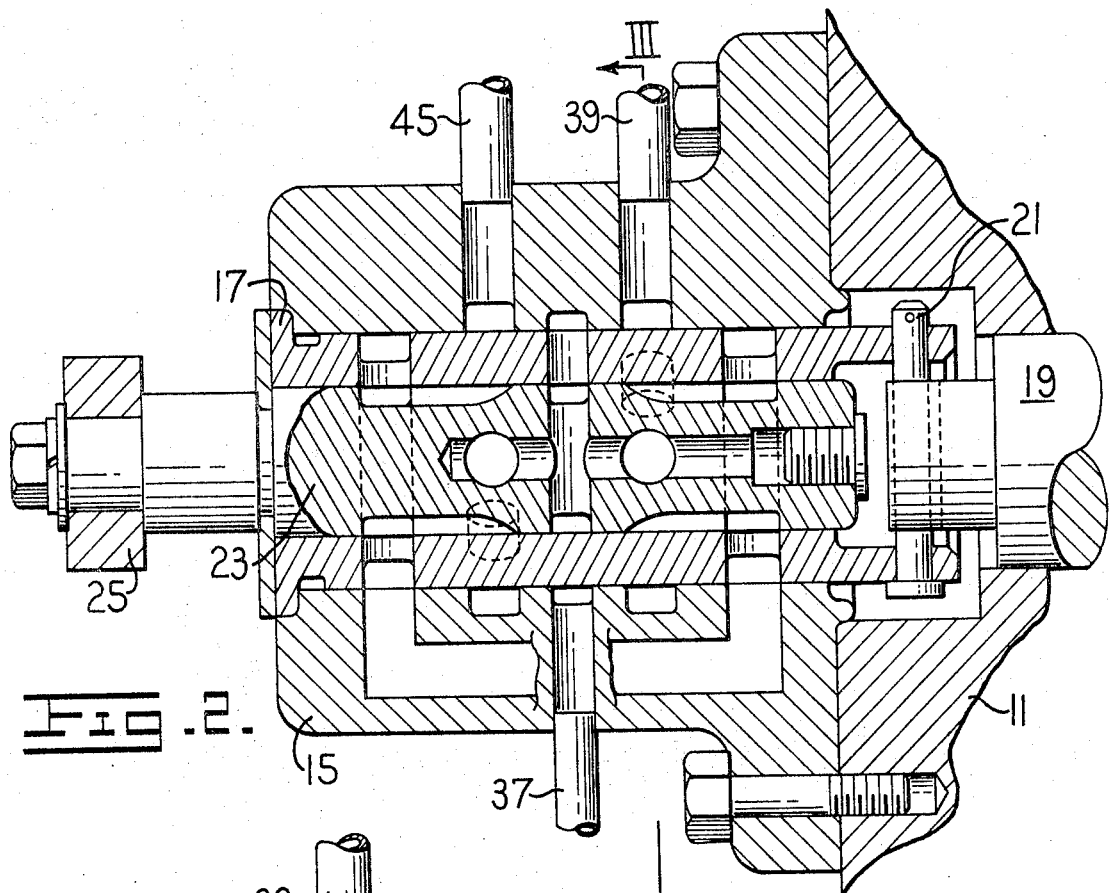
FIG. 2 is a sectional view of a rotary servovalve utilized to actuate the vehicle stabilizer taken along a line II–II of FIG. 1.
Figure 3:
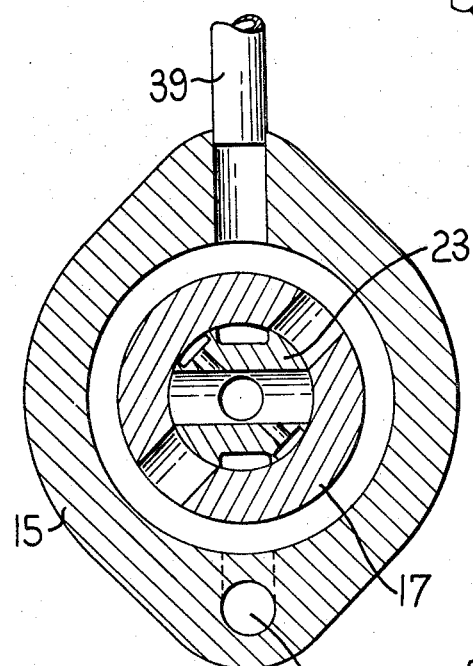
FIG. 3 is a view of the valve shown in FIG. 2 taken along a line III–III thereof.
Figure 5:
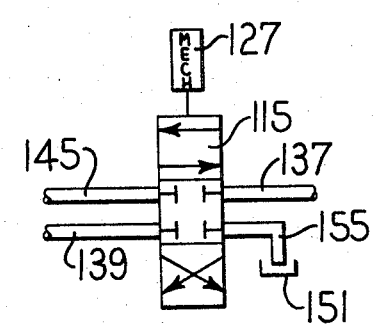
FIG. 5 is a schematic illustration of the actuator valve utilized in the embodiment of FIG. 4.

In the embodiment shown in FIG. 4, a conventional valve 115, mounted on axle 111 and actuated by a link 127 which is connected between the valve spool and vehicle frame 113, replaces the rotary servovalve 15 and its associated linkage described above. Changes in the relative position of axle 11 and frame 113 activate the spool of valve 115 in the manner clearly illustrated in the schematic diagram of FIG. 5 wherein items 137, 139, 145, 151, and 155 perform identical functions as previously described items 37, 39, 45, 51, and 55 respectively.

In this manner, the applicant has provided a novel and improved vehicle stabilizer for use on a vehicle having one or more oscillatable axles.

I claim:

1. In a vehicle having an oscillatable frame means pivotally mounted to an axle, stabilizing means mounted on said vehicle operatively connected between said frame and said axle, a fluid power source for powering said stabilizing means, means responsive to a side force exerted on said vehicle and which operatively connects said stabilizing means to said fluid power source to maintain a constant frame attitude relative to said axle, and means operatively connected between said power source and said stabilizing means for blocking road shock pressures from reaching said power source when said axle is suddenly pivoted relative to said frame, and wherein said force responsive means comprises a valve means which directs hydraulic fluid to said stabilizing means, and wherein said valve means is a rotary servovalve having a sleeve operatively connected to said axle and a spool operatively connected to said frame.

2. In a vehicle having an oscillatable frame means pivotally mounted to an axle, stabilizing means mounted on said vehicle operatively connected between said frame and said axle, a fluid power source for powering said stabilizing means, means responsive to a side force exerted on said vehicle and which operatively connects said stabilizing means to said fluid power source to maintain a constant frame attitude relative to said axle, and means operatively connected between said power source and said stabilizing means for blocking road shock pressures from reaching said power source when said axle is suddenly pivoted relative to said frame, and wherein said force responsive means comprises a valve means which directs hydraulic fluid to said stabilizing means, and wherein said valve means is a servovalve having a first portion fixed to said axle and a second portion fixed to said frame.

3. In a vehicle having an oscillatable frame means pivotally mounted to an axle, stabilizing means mounted on said vehicle operatively connected between said frame and said axle, a fluid power source for powering said stabilizing means, means responsive to a side force exerted on said vehicle and which operatively connects said stabilizing means to said fluid power source to maintain a constant frame attitude relative to said axle, and means operatively connected between said power source and said stabilizing means for blocking road shock pressures from reaching said power source when said axle is suddenly pivoted relative to said frame, and wherein said force responsive means comprises a valve means which directs hydraulic fluid to said stabilizing means, and further including means for transferring fluid from said valve means to said stabilizing means, and accumulator means operatively connected to said transfer means for accepting and replacing fluid displaced from said stabilizing means upon sudden pivotal movement of said axle.

4. The vehicle of claim 3 wherein said shock blocking means comprises a check valve situated so as to block hydraulic fluid from traveling from said valve means to said fluid power source.

5. The vehicle of claim 4 wherein said valve means comprises a servovalve operatively fixed between said frame and said axle.

6. The vehicle of claim 5 wherein said servovalve is a rotary servovalve having a first part fixed to said axle and a second part fixed to said frame.

7. In a vehicle having a frame, an axle, pivot means mounting sad frame to said axle for oscillatory movement, fluid controlled retractible and extendable stabilizing means deposed on either side of said pivot means connecting said frame and said axle for normally maintaining the same in substantial parallel relation, one to the other, one of said stabilizing means being retracted and one of said stabilizing means being extended in response to a side force being applied to said frame, a source of fluid, and fluid means interconnecting said source and said stabilizing means and being responsive to rotation of the frame due to said side force to cause the fluid to enter the retracted and extended stabilizing means to urge the same back to a position where the frame and axle are parallel one to the other.

8. The vehicle of claim 7 wherein the fluid means responsive to pivotal rotation of said frame comprises stabilizing means operatively connected between said frame and said axle, further including a valve means operatively connected between said frame and said axle, which valve means senses frame rotation and directs fluid from said fluid source to said stabilizing means such that said stabilizing means is powered to reestablish parallel relation between said frame and said axle.

9. The vehicle of claim 8, wherein the means responsive to pivotal rotation further comprises a means for blocking road shock pressures from reaching said fluid power source operatively connected to said fluid power source, and accumulator means operatively connected to said stabilizing means for accepting and replacing fluid from said stabilizing means upon sudden pivotal movement of said axle.

10. The vehicle as claimed in claim 9 wherein said valve means comprises a servovalve with a first part fixed to said axle and a second part fixed to said frame.